United States Patent [19]

Kremer

[11] Patent Number: 5,063,960

[45] Date of Patent: Nov. 12, 1991

[54] SAFETY CARTRIDGE FOR COMPRESSED OR LIQUEFIED GAS

[75] Inventor: Paul Kremer, Walferdange, Luxembourg

[73] Assignee: Ceodeux S.A., Luxembourg, Luxembourg

[21] Appl. No.: 648,582

[22] Filed: Jan. 31, 1991

[30] Foreign Application Priority Data

Jan. 31, 1990 [LU] Luxembourg .................. 87670

[51] Int. Cl.$^5$ .................................. B65B 1/04
[52] U.S. Cl. .................. 137/269; 137/599.2; 137/614.17; 141/18
[58] Field of Search .......... 137/599.2, 614.18, 614.19, 137/614.17, 269; 141/18, 21, 20

[56] References Cited

U.S. PATENT DOCUMENTS

| | | |
|---|---|---|
| 3,158,297 | 11/1964 | Ferry .................. 141/21 X |
| 4,703,774 | 11/1987 | Seehausen .......... 137/614.17 |
| 4,760,865 | 8/1988 | Rilett .................. 141/18 X |

Primary Examiner—Alan Cohan
Attorney, Agent, or Firm—Leydig, Voit & Mayer

[57] ABSTRACT

The cartridge has an actuating element (20) designed in the form of a non-return valve, with a widened base (22) forming the closing member and a front part equipped with a peripheral gasket (58) which, in the open position and closed position of the non-return valve, is seated sealingly in a narrowed portion (18a) of a chamber (18). To make it possible to disconnect the service circuit without the risk of an escape of the gases, the said element (20) is displaceable from the closing position towards the opening position of the non-return valve counter to the action of the closing spring (60) as a result of the connection of a first type of connector (70) to the said connecting pipe, and is displaceable beyond the said opening position towards a position of filling and short-circuiting of a residual-pressure valve (48) in which the said element (20) and its peripheral gasket (58) are located in a widened portion (18b) of the said chamber (18), as a result of the connecting of a second type of connector (74) to the said connecting pipe (14).

7 Claims, 2 Drawing Sheets

SAFETY CARTRIDGE FOR COMPRESSED OR LIQUEFIED GAS

The present invention relates to a safety cartridge for compressed or liquefied gas, comprising a body with an inlet channel and an outlet channel via a connecting tube, an essentially cylindrical chamber at the intersection of the inlet channel and outlet channel in the axial extension of the latter, an actuating element sliding axially in the said chamber and comprising a closing member stressed sealingly onto a seat under the action of a closing spring, and a valve subjected to the action of a calibrated spring for containing a residual pressure.

There are taps, for example for gas bottles, with integrated valves intended for containing a particular residual pressure in the bottle, to avoid their emptying completely and thus prevent impurities from penetrating into the bottle. Means are likewise known for neutralising this residual-pressure valve, in order to allow the bottle to be filled in the opposite direction through this valve.

It can happen, however, that the residual-pressure valve closes too soon, that is to say before the pressure falls to the level of the residual pressure at which the valve must normally close. This can occur particularly when the valve is preceded by a constricted pressure-reducing passage, and when the gases tend to form deposits narrowing or blocking this passage. This situation is often monitored by disconnecting the service line and connecting a pressure gauge to it, at the same time neutralising the residual-pressure valve. However, this check involves the danger that the operator may forget to close the main tap before removing the pressure gauge, which may have serious consequences if the gases are toxic or harmful.

The object of the present invention is to provide a safety cartridge of the type described in the introduction, which makes it possible to disconnect the service circuit without the risk of an escape of gas.

To achieve this object, the present invention provides a safety cartridge of the type described in the introduction, which, in its preferred embodiment, is characterised essentially in that the said actuating element is designed in the form of a non-return valve and consists of a substantially cylindrical piston with a widened base forming the closing member and a front part equipped with a peripheral gasket which, in the open position and the closed position of the non-return valve, is seated sealingly in a narrowed portion of the said chamber, in that the said element is displaceable from the closing position towards the opening position of the non-return valve counter to the action of the closing spring as a result of the connection of a first type of connector to the said pipe and in that it is displaceable beyond the said opening position towards a position of filling and short-circuiting of the residual-pressure valve, in which the said element and its peripheral gasket are located in a widened portion of the said chamber, as a result of the connection of a second type of connector to the pipe.

To this end, the actuating element can possess, on the opposite side to the closing member, a head which, in the closed position of the non-return valve, penetrates into the outlet channel through a constriction diverging towards the outlet channel.

The head of the actuating element can possess, furthermore, an axial passage for the gases leaving the cartridge and, at least, one diametral passage for the gases penetrating through the cartridge.

The first type of connector preferably has a rounded end which, in the connecting position, bears on the divergent part of the said constriction, and a peripheral gasket interacting with the inner surface of the connecting pipe. In other words, the fitting of this first type of connector, which is that of a service circuit, automatically displaces the actuating element into the opening position counter to the action of the closing spring, so as to allow the gases to pass into the service circuit under the control of the residual-pressure valve.

The second type of connector preferably has a rounded end which, in the connecting position, bears on the divergent part of the constriction, this rounded end moreover being extended by a tip capable of penetrating through the constriction in order to displace the actuating element. In other words, the fitting of this second type of connector, which can be a connector for filling a bottle by circulating the gas in the opposite direction, or the connector of a pressure gauge for measuring the pressure in the bottle, causes the actuating element to be displaced beyond the opening position counter to the action of the closing spring, in order to open communication between the inlet channel and the outlet channel by providing a passage round the actuating element in the widened portion of the chamber.

The residual-pressure valve can be mounted slideably inside the actuating element and can be stressed by its calibrated spring onto a seat surrounding a constricted passage downstream of the closing member and upstream of the valve.

According to an advantageous embodiment, the closing spring bears, on the opposite side to the closing member, on a piston screwed sealingly into the body of the cartridge and intended to be unscrewed so as to allow the actuating element to slide from the opening position towards the filling position.

Other particular features and characteristics will emerge from the detailed description of an advantageous embodiment given below by way of illustration, with reference to the accompanying drawings in which.

Figure 1:
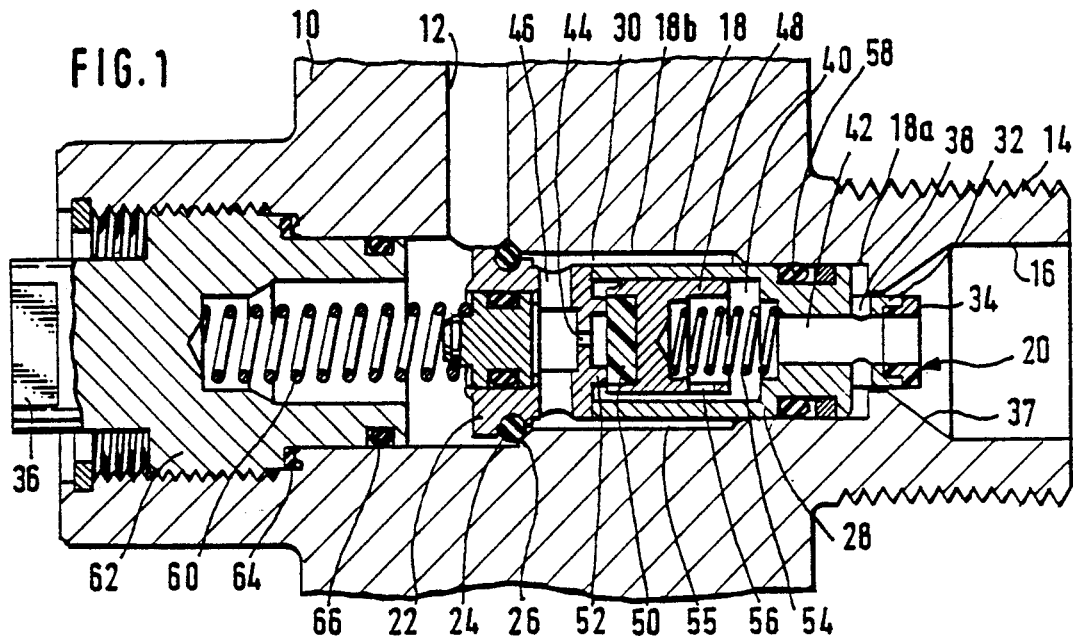
FIG. 1 shows a view in axial section of a cartridge according to the present invention in the closed position.

The description of the composition of the safety cartridge will refer to the three figures simultaneously. The cartridge consists of a body 10 provided downstream of a main shut-off tap between a gas source, for example a gas bottle, and a service circuit. The body 10 has an inlet channel 12 in communication with the gas source and a connecting pipe 14 with an outlet channel 16 which can be connected to a service circuit At the intersection of the inlet channel 12 and outlet channel 16 there is, in the axial extension of the latter, a chamber 18 of substantially cylindrical form, but of a cross-section which is variable for reasons described in more detail later. Located in this chamber 18 is an actuating element 20, the axial displacement of which defines the various functions of the cartridge.

The actuating element 20 has a widened base 22 which forms the closing member.. For this purpose a gasket 24, for example an O-ring gasket, is provided round the base 22, in order to interact, in the closing position, with a seat 26 provided in the wall of the chamber 18 level with the penetration of the channel 12 into this chamber.

The major part of the actuating element 20 is formed by a hollow piston 28 of cylindrical form, the outside diameter of which corresponds substantially to the inside diameter of the narrowest portion 18a of the chamber 18, this portion 18a being located on the same side as the outlet channel 16, whilst a wider portion 18b extends from level with the inlet channel 12 as far as the narrowed portion 18a, in order to define with the actuating element 20 an annular cylindrical space 30.

The front part of the actuating element 20, on the same side as the outlet channel 16, consists of a cylindrical head 32 of a cross-section smaller than that of the cylindrical part 28. Moreover, the end 34 of this head 32 can be designed in the form of a sealing plug. Between the chamber 18 and the channel 16 is located a constriction 36 which diverges towards the outlet channel 16, whilst its inner edge can be diametral. The orifice cross-section of this constriction is slightly larger than the cross-section of the head 32 in order, as shown in FIG. 1, to allow the latter to be capable of penetrating into the divergent part of the constriction 36. The head 32 has one or more passages 38 running diametrally through the head level with the shoulder with the cylindrical part 28.

A substantially cylindrical cavity 40 is located in the central part of the actuating element 20. This cavity 40 is open through the head 32 by way of an axial passage 42. On the opposite side, this cavity 40 communicates, via a constricted calibrated passage 44 functioning as a pressure reducer, with a channel 46 pierced diametrally in the actuating element 20 between its central cylindrical part 28 and its base 22.

Arranged in the cavity 40 is a non-return valve 48 with a sealing plug 50, which is stressed by a spring 54 in the direction of a seat 52 round the constricted flow-regulating passage 44.

The valve 48 is not mounted sealingly in the cavity 40, so as to leave one or more lateral passages 55. Moreover, one or more ports 56 are provided in the lateral wall of the valve 48.

A circular gasket 58, for example an O-ring gasket, ensures the sealing of the actuating element 20 in relation to the narrowest portion 18a of the chamber 18.

The actuating element 20 is stressed in the closing direction by a spring 60 bearing on a piston 62 which is screwed into the body 10 on the opposite side to the channel 16 and of which the sealing relative to the body 10 is obtained by means of a plurality of gaskets 64, 66. The head 66 of the piston 62 is designed so as to be actuatable by means of a key or screwdriver in order to displace the piston 62 between two end positions illustrated respectively in FIGS. 1 and 3 and preferably determined by stops.

The functioning of the device described above will now be described with successive reference to FIGS. 1 to 3.

In FIG. 1, the cartridge is in the closed position, the closing member 22 of the element 20 being laid sealingly onto its seat 26 under the action of the spring 60, whilst the head 32 of the element 20 penetrates through the constriction 36 into the channel 16.

Figure 2:
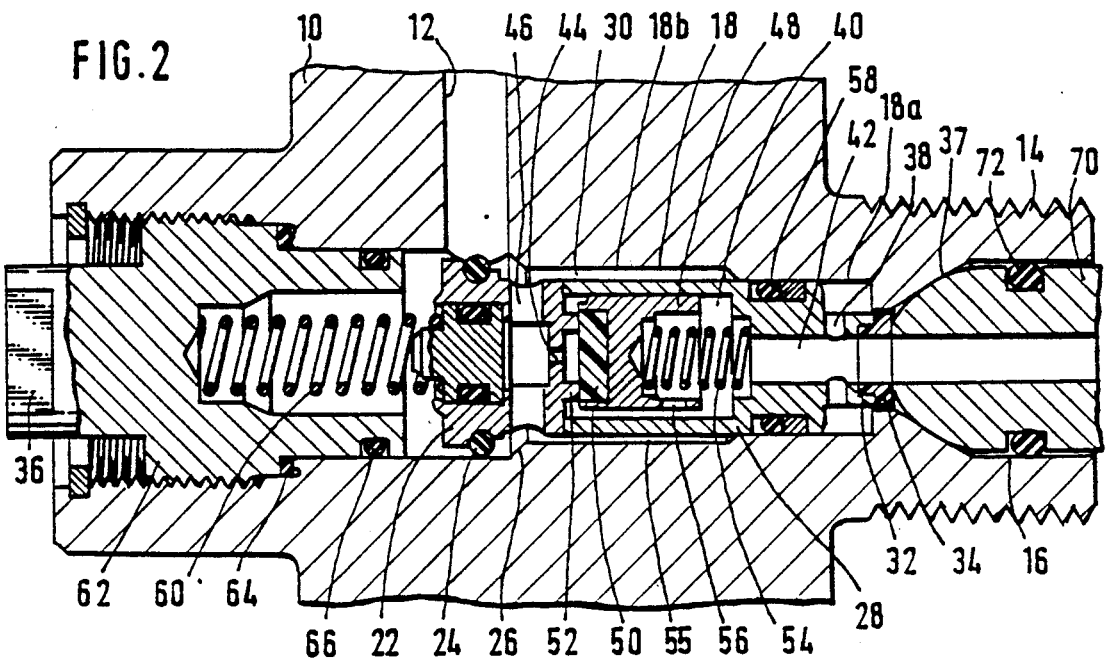
FIG. 2 shows a similar view of the cartridge in the open position.

The opening of the cartridge illustrated in FIG. 2 is obtained by introducing into the outlet channel 16 a connector 70 of a line of a service circuit. The fitting of this connector 70 depresses the head 32 through the constriction 36 and displaces the actuating element 20 counter to the action of the spring 60 so as to lift the gasket 24 from its seat 26 and thereby at this location open the passage for the compressed gas in the channel 12. It should be noted that connector 70 is equipped with a gasket 72 arranged so as to ensure the sealing with the channel 16 before the end touches the head 32. The end of the connector 70 can be rounded, so as to ensure some sealing as a result of a bearing on the constriction 36, without its being blocked on this.

In this opening position according to FIG. 2, the actuating element 20 still ensures sealing relative to the body 10 by means of its gasket 58 which is still located in the narrowed portion 18a of the chamber 18. In contrast, the compressed gas can penetrate through the constricted passage 44, and when its pressure exceeds the residual-pressure threshold it is capable of lifting the valve 48 from its seat 52 counter to the action of the spring 54, so as to escape by way of the passage 55, either directly or via the port 56 through the axial passage 42 and the connector 70 into the service circuit.

The removal of the connector 70 from the channel 16 releases the head 32 and the actuating element 20, so that the gasket 24 is automatically laid onto its seat 26 under the action of the spring 60, without any leakage of gas, because closure is obtained level with the gasket 24 before the gasket 72 comes free of the channel 16.

Figure 3:
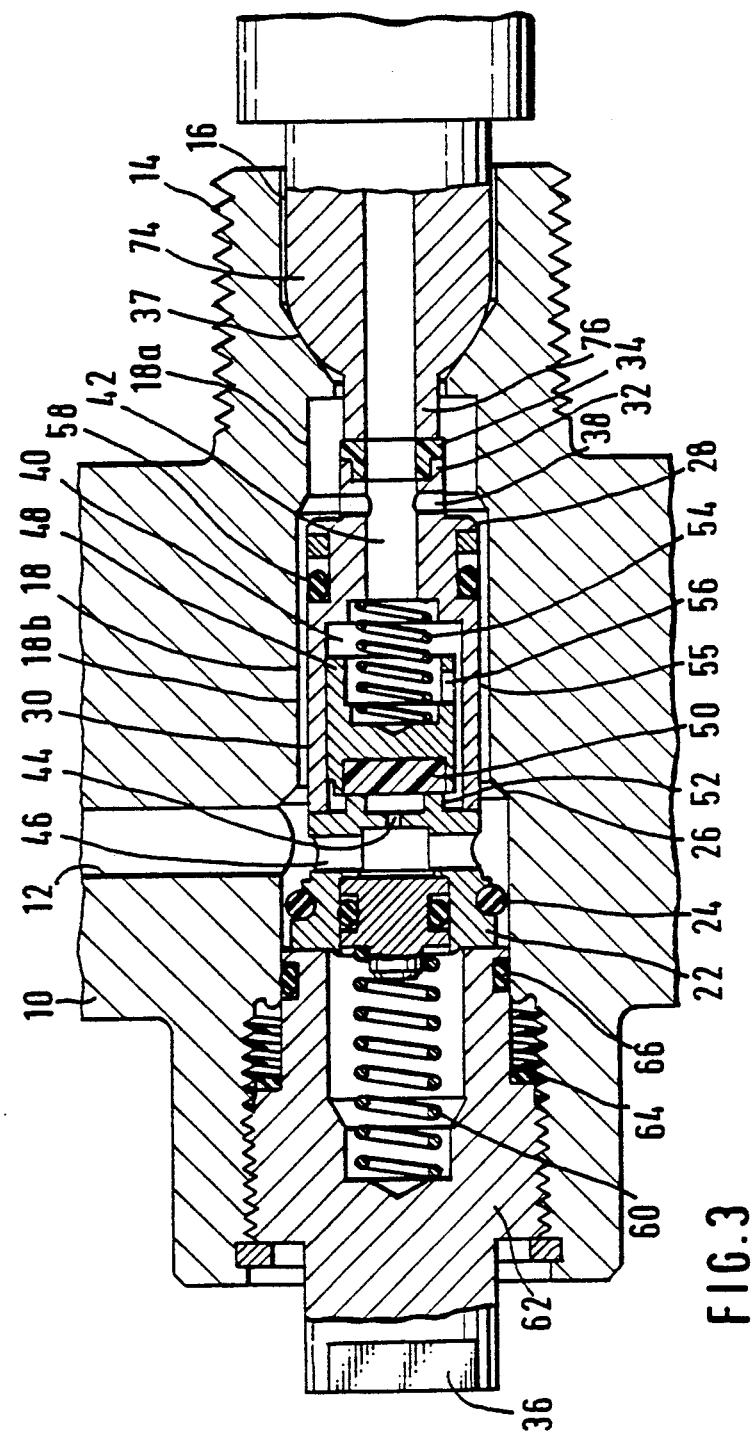
FIG. 3 shows a similar view of the cartridge in the filling position.

To actuate the element 20 from the position of Figure towards the position of FIG. 3, it is first necessary to unscrew the piston 62 completely. Subsequently, a second type of connector 74 is introduced into the channel 16, this resembling the connector 70, but also possessing a tip 76 which can penetrate through the constriction 36 in order to displace the actuating element 20 counter to the action of the spring 60 towards the position of FIG. 3.

In this position, the residual-pressure valve 48 is short-circuited, since the gasket 58 of the actuating element 20 is located in the widened portion 18b of the chamber 18 where it no longer performs a sealing function. There is therefore direct communication between the channel 12 and the connector 74 via the space 30 round the actuating element 20 and the passages 38 and 42. It is therefore possible to fill the bottle by means of the connector 74 by circulating the gas in the opposite direction between the channel 16 and the channel 12. The connector 74 can also be that of a pressure gauge for measuring the gas pressure in the bottle.

When the connector 74 is removed, the cartridge closes automatically, without any gas leakage, under the action of the spring 60 which is sufficiently strong to displace the actuating element 20 from the position of FIG. 3 towards the closing position of FIG. 1.

It should be noted that the connector 74 can have a gasket (not shown) similar to the gasket 72. Moreover, the two connectors 70 and 74 possess means (not shown) for fixing them to the connecting pipe 14.

I claim:

1. Safety cartridge for compressed or liquefied gas, comprising a body (10) with an inlet channel (12) and an outlet channel (16) via a connecting pipe (14), an essentially cylindrical chamber (18) at the intersection of the inlet channel (12) and outlet channel (16), in the axial extension of the latter, an actuating element (20) sliding axially in the said chamber (18) and comprising a closing member (22) stressed sealingly onto a seat (26) under the action of a closing spring (60), and a valve (40) subjected to the action of a calibrated spring (54) for containing a residual pressure, characterised in that the said actuating element (20) is designed in the form of a non-return valve and consists of a substantially cylindrical piston (28) with a widened base (22) forming the closing member and a front part equipped with a peripheral gasket (58) which, in the open position and closed position of the non-return valve, is seated sealingly in a narrowed portion (18a) of the said chamber (18), in that the said element (20) is displaceable from the closing position towards the opening position of the non-return valve counter to the action of the closing spring (60) as a result of the connection of a first type of connector (70) to the said connecting pipe and in that it is displaceable beyond the said opening position towards a position of filling and short-circuiting of the residual-pressure valve (48) in which the said element (20) and its peripheral gasket (58) are located in a widened portion (18b) of the said chamber (18), as a result of the connecting of a second type of connector (74) to the said connecting pipe (14).

2. Cartridge according to claim 1, characterised in that the said actuating element (20) possesses, on the opposite side to the closing member (22), a head which, in the closed position of the cartridge, penetrates into the outlet channel (16) through a constriction (36) diverging towards the outlet channel (16).

3. Cartridge according to claim 2, characterised in that the said head (32) of the actuating element (20) possesses an axial passage (42) for the gases leaving the cartridge and, at least, one diametral passage (38) for the gases penetrating through the cartridge.

4. Cartridge according to claim 1, characterised in that the said first type of connector (70) has a rounded end which, in the connecting position, bears on the divergent part of the said constriction (36), and a peripheral gasket (72) interacting with the inner surface of the connecting pipe (14).

5. Cartridge according to claim 1, characterised in that the second type of connector (74) has a rounded end which, in the connecting position, bears on the divergent part of the said constriction (36), and in that the said rounded end is extended by a tip (76) capable of penetrating through the said constriction (36) in order to displace the actuating element (20).

6. Cartridge according to claim 1, characterised in that the residual-pressure valve (48) is mounted slideably inside the actuating element (20) and is stressed by its calibrated spring (54) onto a seat (52) surrounding a constricted passage (44) downstream of the closing member (22).

7. Cartridge according to claim 1, characterised in that the closing spring (60) bears, on the opposite side to the closing member (22), on a piston (62) screwed sealingly into the body of the cartridge and intended to be unscrewed so as to allow the actuating element (20) to slide beyond the opening position towards the filling position.

* * * * *